Aug. 26, 1969     H. R. OLVERA     3,462,781
BOAT LAUNCHING DOLLY

Filed Oct. 5, 1967     2 Sheets-Sheet 1

INVENTOR.
Henry R. Olvera
BY
Webster & Webster
ATTYS.

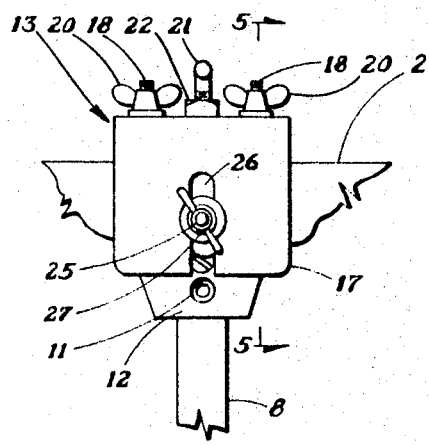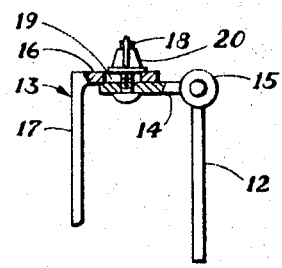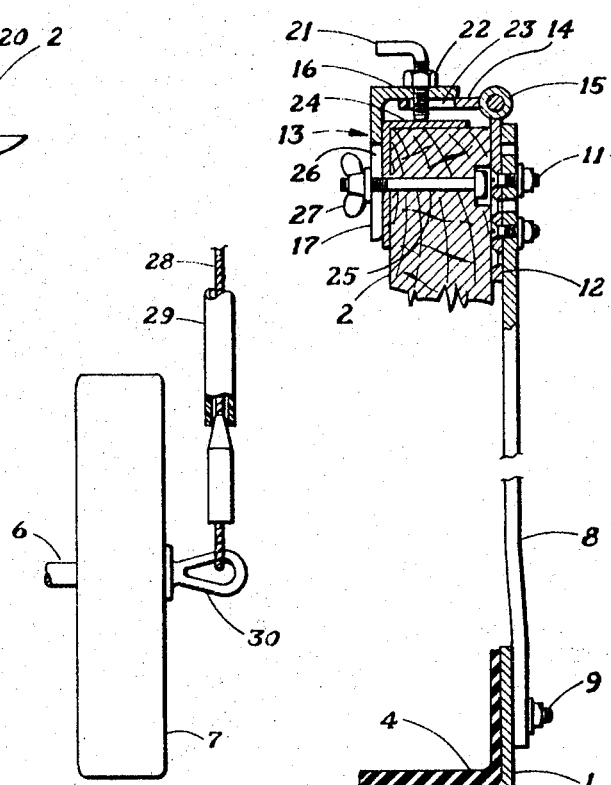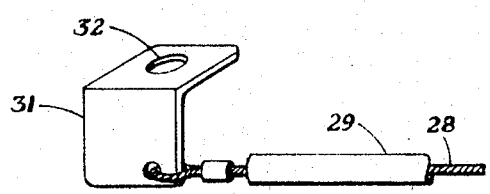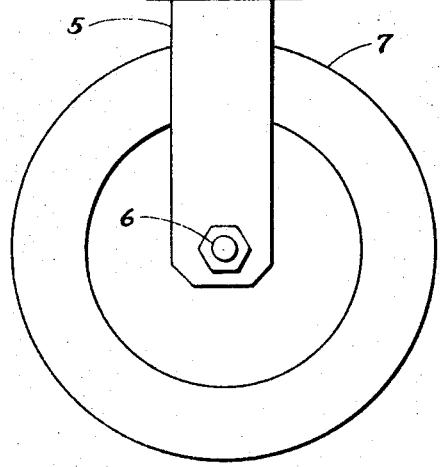

United States Patent Office

3,462,781
Patented Aug. 26, 1969

3,462,781
BOAT LAUNCHING DOLLY
Henry R. Olvera, 1636 S. Sacramento St.,
Lodi, Calif. 95240
Filed Oct. 5, 1967, Ser. No. 673,049
Int. Cl. B63c 13/00; B60p 3/10
U.S. Cl. 9—1                                    7 Claims

ABSTRACT OF THE DISCLOSURE

A dolly for detachable mounting on the transom of a relatively small boat; the dolly being arranged so that it aids in the manual handling and ground transport of such boat preparatory to, and during, launching of the same, and does not need to be detached from the boat when the latter is being operated in the water.

BACKGROUND OF THE INVENTION

The dolly is particularly designed for use on, and for ground transport of, small rowboat-type boats such as are commonly carried upside down on a car top and which—when removed from the car—must, in the absence of a dolly, be carried some distance to a ramp or the like for launching into the water. While this type of dolly is generally known, they have not been particularly successful; this due either to poor design, complexity of structure, or inconvenience of use. The present invention was conceived in the direction of overcoming these objections.

SUMMARY OF THE INVENTION

The present invention provides, as a major object, a dolly—for the purpose described—which is well designed, simple in structure, and arranged so that it may be effectively but detachably mounted, without constructional changes, on boat transoms of different dimensions in width, thickness, and depth.

The present invention provides, as another object, a boat launching dolly which remains on the boat in use, and does not interfere with the operation of the boat in the usual manner; this whether the boat is being rowed, or is propelled by a transom-mounted outboard motor.

The boat launching dolly includes supporting wheels which, of course, normally depend below the level of the bottom of the boat when the dolly is attached thereto, and the present invention provides, as an additional object, a wheel-mounting structure arranged so that—should the boat be operating in shallow water and run aground, or the depending wheels strike a submerged object—the wheels can swing to the rear and raise clear of the bottom or of such object whereby no damage will be done to the dolly or boat.

The present invention provides, as a further object, a boat launching dolly which is compact and lightweight, and yet quite rugged.

The present invention provides, as a still further object, a boat launching dolly which is designed for ease and economy of manufacture, and convenience of use.

The present invention provides, as a still further object, a practical and reliable boat launching dolly, and one which is exceedingly effective for the purpose for which it is designed.

BRIEF DESCRIPTION OF THE DRAWINGS

FIG. 3 is an enlarged vertical section taken on line 3—3 of FIG 2.

FIG. 4 is a front end view of one of the transom-clamping units, detached.

FIG. 5 is a fragmentary section of such clamping unit, taken on line 5—5 of FIG. 4.

FIG. 6 is a fragmentary plan view showing the connecting means between one wheel axle and the adjacent end of a guy cable.

FIG. 7 is a perspective view of the connecting means between the forward end of a guy cable and an oarlock of the boat.

DESCRIPTION OF THE PREFERRED EMBODIMENT

Figure 1:
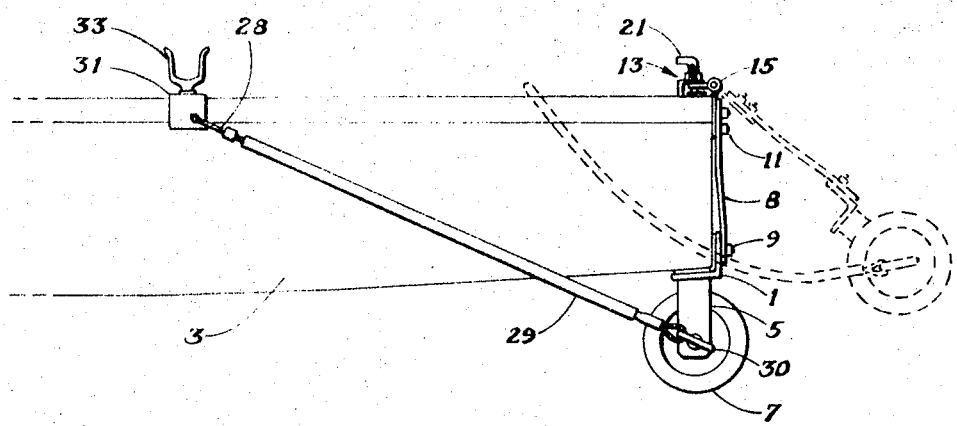
FIG. 1 is a side elevation of the dolly as mounted on a boat.

Referring now more particularly to the drawings and to the characters of reference marked thereon, the dolly comprises a transverse L-shaped cradle bar 1 having a length not greater than the width of the transom 2 of a conventional type of small boat 3 such as may be transported in an upside-down position on top of an automobile. The cradle bar 1 is preferably angled slightly in a lengthwise direction to conform to the contour of the lower edge of the transom 2, which the bar is adapted to matchingly receive, as shown. The cradle bar 1 is lined with suitable cushion material 4.

Adjacent its ends, pairs of transversely spaced brackets 5 depend from the bar 1; each pair of brackets supporting a stub axle 6 which projects beyond the adjacent end of the bar 1 and supports a small diameter wheel 7 which does not extend above the level of the lower edge of said bar.

The L-shaped cradle bar 1 is supported by a pair of transversely spaced upstanding legs 8. At its lower end, each leg 8 is connected to the back of L-shaped bar 1 by a single bolt 9 projecting through the leg and through any one of a number of spaced holes 10 in the back flange of such bar. At its upper end, each leg 8 is rigidly but vertically adjustably connected, as at 11, to the back plate 12 of a transom clamping unit, indicated generally at 13. Each clamping unit 13 includes, besides the back plate 12, a top plate 14 adapted to overlie the transom 2, and which plate is connected to the upper edge of the back plate 12 by a hinge 15. The top plate 14, in turn, is lapped by a plate 16 projecting rearwardly from the upper edge of a vertical depending front plate 17; the plates 16 and 17 together providing a rigid L-shaped member. The top plate 14 and lapping plate 16 are clamped together for adjustment lengthwise of the boat, and thus relative to the thickness of the transom, by means of spaced studs 18 projecting upwardly through slots 19 in the plate 16; wing nuts 20 or the like engaging the studs 18 to clamp the plates together.

The lapping plate 16 is vertically adjustably mounted relative to the upper edge of the transom 2 by means of a manually adjustable clamping screw 21 threaded through a nut 22 secured on said plate 16; the screw projecting through a slot 23 in the plate 14. The screw 21, however, does not directly engage the transom, but bears against an inverted L-shaped metal protector 24, the upper flange of which is disposed between the plate 14 and the upper edge of the transom, while the other flange is disposed between the front plate 17 and the face of the transom, as shown. It may be noted that the screw 21 is located centrally of the width of the plate 16, and midway between the studs 18, with which the screw 21 is preferably alined.

By tightening the screws 21, with wing nuts 27 loosened, the clamping units 13 are raised and the legs 8 are drawn upward whereby the cradle bar 1 is firmly clamped against the lower edge of the transom and effectively held in place. The wing nuts 27 are( of course, retightened after clamping in place of the cradle bar 1.

The front plate 17 is clamped to the adjacent flange of the protector 24, and consequently to the transom—for vertical adjustment relative thereto—by means of a clamping bolt 25 secured in and projecting through the transom and thence through said adjacent flange of the protector 24, and a vertical slot 26 in the plate 17; a wing nut 27 on the bolt 25 bearing against said plate 17 as shown.

A light guy cable 28, encased in a flexible non-abrading tube 29, extends from connection with an eye 30 on the outer end of each axle 6, to a connection with the depending portion of a rigid L-shaped bracket 31 adapted to project down the side of the boat on the outside. The other and substantially horizontal portion of the bracket overhangs the corresponding upper edge or gunwale of the boat and is provided with an orifice 32 which receives the depending stem of an oarlock 33 with which the boat is normally equipped. The bracket 31 detaches from the oarlock when the stem of the latter is lifted out of its socket.

With the foregoing construction of my improved boat dolly, it will be seen that when mounted on the boat as described, the boat—when lowered to the ground after being carried on the roof of a car to adjacent the point of launching—may be readily wheeled to and run down the launching ramp and into the water by one person. Then, if desired, the dolly may be easily detached from the boat by merely disconnecting the guy cables 28 from the oarlocks 33, and retracting the clamping screws 21 and loosening the wing nuts 27. This loosens and lowers the clamping units 13 on the transom, and enables the cradle bar 1 to be swung back and clear of the transom. This, in turn, permits the clamping units 13 to be lifted clear of the transom, and the dolly thus entirely detached from the transom.

If, however, it is not desired to detach the dolly from the boat after the latter is in the water, it will be found that no interference with the operation or safety of the boat is encountered; this because of the light weight of the dolly, and the small amount of drag offered by the parts projecting below the boat.

If the boat is being operated with the dolly remaining in place, and in water the depth or bottom conditions of which are uncertain, the guy cables may be disengaged from the oarlocks, and allowed to hang free in the boat. This will allow the cradle bar, and depending parts including the wheels, to swing about the hinges 15 of the clamping units 13 as an axis and to a point rearward and clear of the transom, as indicated in dotted lines in FIG. 1, in the event that the initially depending brackets 5 or wheels 7 strike a submerged object or the boat runs aground. Thus, no damage to the dolly is done under such conditions.

It will be apparent, from the foregoing description of the structure of the dolly that provision has been made for adjustment of certain of the parts so that the dolly may be fitted to boats having transoms of different thickness, depth, or width.

Further, the guy cables 28 and their casing tubes 29 may, of course, be easily cut to the proper length—to suit the distance between the transom of a boat and its oarlocks—when the dolly is being fitted to any particular boat so that (when said guy cables are connected as intended) they will be substantially taut and prevent accidental rearward escape of the cradle bar 1 from the transom 2.

Figure 2:
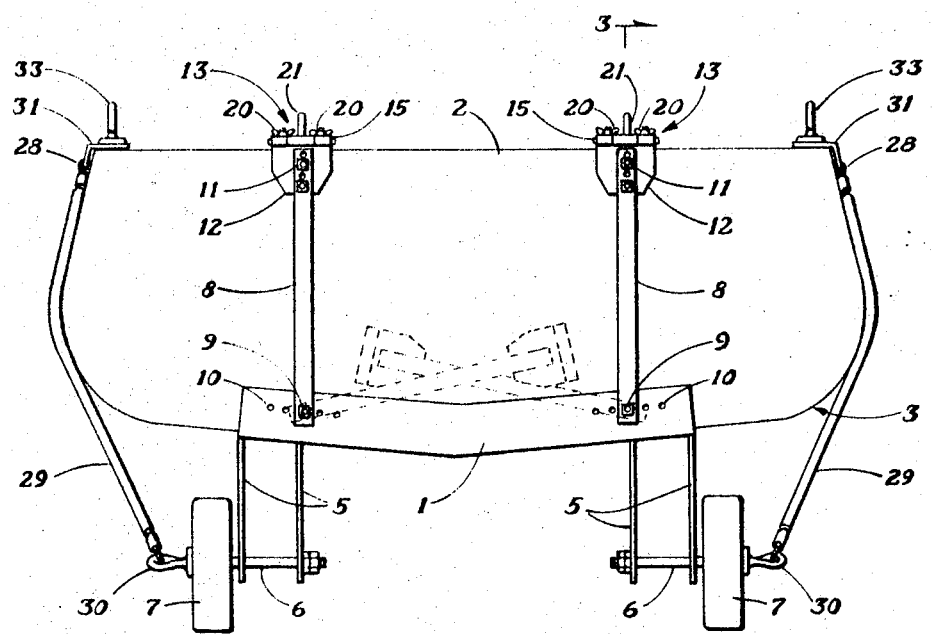
FIG. 2 is a rear and elevation of the boat-mounted dolly.

Additionally, when the dolly is being transported as a detached article, either inside a boat or in the trunk of a car, the legs 8 may be folded downwardly toward each other about the bolts 9 as an axis whereby to reduce the total height of the dolly, as indicated in dotted lines in FIG. 2, and thus make the same more compact.

It is also of importance that the dolly, when attached to a boat, is not in the way of an outboard motor which may be mounted on the transom, and does not interfere with the operation of such motor; the latter occupying a position between and in clearance relation to the clamping units 13.

From the foregoing description, it will be readily seen that there has been produced such a boat launching dolly as substantially fulfills the objects of the invention, as set forth herein.

I claim:
1. A dolly, for attachment to the transom of a boat, comprising a rigid cradle bar adapted to receive the lower edge of the transom of the boat, wheels mounted in connection with and depending below the cradle bar, transversely spaced clamping units adapted to engage over the upper edge of the transom and to be clamped thereto, and tranversely spaced legs back of the transom extending between and connected to the clamping units and cradle bar; the cradle bar being directly horizontally rearwardly disengageable from the transom and the legs at their upper ends being hinged to the clamping units to permit of rearward and upward swinging movement of the cradle bar and wheels upon such rearward disengagement of said bar from the transom.

2. A dolly, as in claim 1, with guy cables connected to the cradle bar adjacent the ends thereof and adapted to extend forwardly therefrom, and means on the forward ends of the cables for detachable holding engagement with elements upstanding from the gunwale of the boat a distance ahead of the transom.

3. A dolly, for attachment to the transom of a boat, comprising a rigid cradle bar adapted to receive the lower edge of the transom of the boat, wheels mounted in connection with and depending below the cradle bare, transversely spaced clamping units adapted to engage over the upper edge of the transom and to be clamped thereto, and transversely spaced legs back of the transom extending between and connected to the clamping units and cradle bar; each clamping unit including a top plate and a front plate rigid with each other, a bolt mounted in and projecting through and forwardly from the transom, a vertical slot in the front plate through which said bolt projects, a clamping nut on the forward end of the bolt, and a clamping screw mounted in connection with the top plate and depending therefrom for pressing engagement with the upper edge portion of the transom.

4. A dolly, for attachment to the transom of a boat, comprising a rigid cradle bar adapted to receive the lower edge of the transom of the boat, wheels mounted in connection with and depending below the cradle bar, transversely spaced clamping units adapted to engage over the upper edge of the transom and to be clamped thereto, and transversely spaced legs back of the transom extending between and connected to the clamping units and cradle bar; each clamping unit including a top plate, a front plate rigid with the top plate, means to clamp the front plate to the transom, a back plate to which the related leg is attached, and a transverse hinge connecting the back plate and the top plate.

5. A dolly, as in claim 4, which includes a separate plate rigid with the front plate and lapping the top plate, the hinge extending along the rear edge of said top plate, and means connecting the top plate and said separate plate for relative fore and aft adjustment.

6. A dolly, as in claim 5, in which said separate plate overlaps the top plate; said connecting means comprising a nut secured on such separate plate substantially centrally of the area thereof, and a clamping screw threaded through the nut and extending below the top plate for engagement with the upper edge portion of the transom, the top plate having a longitudinal slot through which the screw projects.

7. A dolly, as in claim 6 in which the clamping means vertically adjustably secures the front plate to the transom, a separate plate rigid with and projecting rearwardly from the upper edge of the front plate and lapping the top plate, means longitudinally adjustably connecting the top plate and said separate plate, and a clamping screw threaded in connection with said last named plates and depending therefrom for pressing engagement with the upper edge portion of the transom.

References Cited

UNITED STATES PATENTS

| | | | |
|---|---|---|---|
| 2,305,284 | 12/1942 | Trabant | 280—47.13 |
| 2,551,040 | 5/1951 | Newell | 280—47.13 |
| 2,899,213 | 8/1959 | Winger | 280—47.13 |
| 2,916,747 | 12/1959 | Parrott. | |
| 3,093,386 | 6/1963 | Case. | |
| 3,138,808 | 6/1964 | Quigg. | |

LEO FRIAGLIA, Primary Examiner

JOHN A. PEKAR, Assistant Examiner

U.S. Cl. X.R.

280—47.13, 414